United States Patent [19]

Jaccard

[11] Patent Number: 4,463,476
[45] Date of Patent: Aug. 7, 1984

[54] MEAT TENDERIZER

[75] Inventor: Andre R. Jaccard, Holland, N.Y.

[73] Assignee: Jaccard Corporation, Orchard Park, N.Y.

[21] Appl. No.: 481,893

[22] Filed: Apr. 4, 1983

[51] Int. Cl.³ .............................................. A22C 9/00
[52] U.S. Cl. ..................................................... 17/30
[58] Field of Search .................. 17/25, 30, 31; 30/305

[56] References Cited

U.S. PATENT DOCUMENTS 1,903,789 4/1933 Michaels ............................. 17/30 X
4,199,841 4/1980 Jaccard ................................... 17/30

Primary Examiner—Willie G. Abercrombie
Attorney, Agent, or Firm—James J. Ralabate

[57] ABSTRACT

An improved hand operated meat tenderizer is disclosed which is easier to use and to keep clean than those of the prior art.

20 Claims, 4 Drawing Figures

MEAT TENDERIZER

This invention relates to a meat tenderizer, and, more specifically, to a hand operated tenderizer having new and useful improvements.

BACKGROUND OF THE INVENTION

Many cuts of meats, fish or poultry require tenderizing before consumption, and presently there are various means available for accomplishing this. Chemical tenderizers have been used extensively for tenderizing meats; however, whenever chemicals are used there are many inherent drawbacks. The two most serious drawbacks to chemical tenderizers are high cost and flavor causing changes in the meat. While certain of these compositions have attained some degree of commercial success, there remains a sacrifice of real meat flavor when these additives are used. The basic principle upon which these chemicals operate is to chemically break down the tissue of the meat and thereby soften the meat for consumption.

The other type of meat tenderizer in use today is the mechanical tenderizer which is far superior to the chemical tenderizer in many ways. Some of the mechanical means used are very basic methods, such as pounding or surface treating of the meats, while other used mechanical devices are more sophisticated apparatuses involving the use of piercing element blades and the like. Most of the mechanical tenderizers are large, expensive mechanical tenderizers are large, expensive pieces of commercial equipment that are somewhat complicated to use. The more practical and popular mechanical meat tenderizer is the hand used device, that is designed and intended for home use. Typical of these devices are those disclosed in U.S. Pat. Nos. 207,107 issued Aug. 20, 1878; 215,511 issued May 20, 1879; 863,717 issued Aug. 20, 1907; 3,611,476 issued Oct. 12, 1971; and 4,199,841 issued Apr. 29, 1980. While a hand operated tenderizer is desirable in many ways, the one serious drawback seems to be in cleaning the device thoroughly after use. Some of the devices cannot be disassembled, thus must be cleaned from the exterior. Other devices such as that disclosed in U.S. Pat. No. 4,199,841 can be easily disassembled, but frequent disassembly because of frequent use can be inconvenient and bothersome. Since the use of these tenderizers is primarily by the housewife, she generally does not have the time nor inclination to test her mechanical skills on constructing and taking apart mechanical apparatuses. Because the hand tenderizer accumulates meat and fat particles when used, it could cause an unsanitary situation if these particles are permitted to remain in the device. In the cleaning operation, water or other liquids accumulate in the interior of the tenderizer casing and could become stagnant if permitted to remain. Also, it is just as important that the interior of the machines or devices be clean as it is for the exterior of the casing or blades. Also, it is frequently required to disassemble the tenderizer for lubrication where moving parts or springs are utilized. Another drawback on tenderizers such as those disclosed in U.S. Pat. No. 4,199,841 is that the cover for protecting the blades has a tendency to loosen and fall off or away from the main structure, thereby exposing the blades and meat contacting portion to the possibility of contamination or other unsanitary conditions when not in use.

SUMMARY OF THE INVENTION

It is therefore an object of this invention to provide a hand used meat tenderizer devoid of the above noted disadvantages.

It is another object of this invention to provide a hand used tenderizer having a construction that will facilitate cleaning and maintaining of the device in a sanitary condition.

It is a further object of this invention to provide a construction for this tenderizer that will permit both cleaning and lubrication of the device when required.

Another still further object of this invention is to provide a hand tenderizer having a protective closure for the casing that will prevent inadvertent opening of the case.

Still another object is to provide a case construction for a hand held meat tenderizer that will assist in maintaining the blades and meat contacting portion in sanitary condition.

Still a further object of this invention is to provide a hand held tenderizer having an improved construction fostering cleanliness and improved operability.

The foregoing objects and others are accomplished in accordance with this invention by providing a hand meat tenderizer comprising a handle, a blade assembly and resilient means associated with said handle and said blade assembly. A configuration similar to that of the tenderizer of U.S. Pat. No. 4,199,841 is used and improved upon by this invention. The handle consists of a pair of separable members having therein a housing for the spring or resilient means that will permit the blades to move in a substantially vertical manner when pressure is exerted thereon. Alternatively, the blades can move at any angle against a horizontal plane if the structure of the tenderizer is modified accordingly. The housing or cavity for the spring will take on and retain water, debris or other liquids when the tenderizer is cleaned. Also, additional cavities in the interior of the handle will take on water or cleaning fluids and debris, and retain it to create a potential unsanitary condition especially for a food tool. Extending from the interior of said housing or housings and the exterior of the handle is an aperture or apertures that will permit draining out of the water or liquid containing debris. The tenderizer can then after cleaning and draining be rinsed and thoroughly cleaned both in its exterior and interior portions. It is preferred that the apertures extend through both the upper and lower portions of the handle or housing to permit easier flow of the liquid to be drained from the cavities or hollow portions.

Also, as another bonus feature of this contruction, the upper apertures will facilitate oil or lubrication fluids to be injected therethrough for lubrication of the spring and interior metal portions of the tenderizer. Generally a drop or two of cooking oil can be used to lubricate the tenderizer through these apertures. This oil coating will protect the interior steel from corrosion while at the same time lubricating the springs and blades for smoother operation.

Another improvement feature of this invention is in preventing the blade cover from becoming loose. The tendency of the cover to become loosened from the main tenderizer portion could cause accidents resulting from the sharp blades protruding therefrom. Also, since the blades are the portion of the tenderizer that engage the meat, it is important that they be kept as clean as possible. Therefore, a blade cover that has substantially improved protection capabilities is provided by this invention. This is accomplished by putting slight abuttments or extensions in the exterior bottom surface of the handle member. These abuttments hold the handle member surfaces against the blade cover or cap and by springlike action hold the cover on tighter. This same result can be accomplished by making this resilient plastic cover slightly smaller than the periphery of the main or handle portion.

This invention therefore provides an improved construction for the tenderizer of U.S. Pat. No. 4,199,841 that enhances its cleanibility and operability. The cleanability is improved by providing a means for lubricating and coating the interior metal portions with a protective oil surface, and means for maintaining the cover more securely on the main enclosures and over the blades. The oil coating on the spring and interior portions of the blades has the bonus effect of lubricating the springs for better operability. The blade assembly can consist of one or several blade segments and can have any desired number of sharpened knife blades projecting from one edge thereof. In lieu of blades, any sharp or pointed projection may be used. In one embodiment of this invention, a tenderizer having one blade or blade assembly is used, and in another model more than one blade or blade assembly is used. In the preferred embodiments, one and three blade segments are used, however any desired number of blade segments or blades can be utilized. "Blade segment" is intended to cover a segment having one or more blades or pointed structures.

The tenderizer of this invention can comprise an aperture extending from the interior of the handle means to the exterior thereof in any position in the lower portion of the handle means. It can be located adjacent the blades or further toward the sides of the tenderizer lower portion. The important aspect of the invention is that the apertures or channels extend from the interior hollow portion of the housing to the outer portion of the housing, be both above and below the hollow portion. This will facilitate the easy flow of liquids out of the interior of the housing. This construction will be further defined when described in association with the accompanying drawing.

DESCRIPTION OF THE PREFERRED EMBODIMENTS

Figure 1:
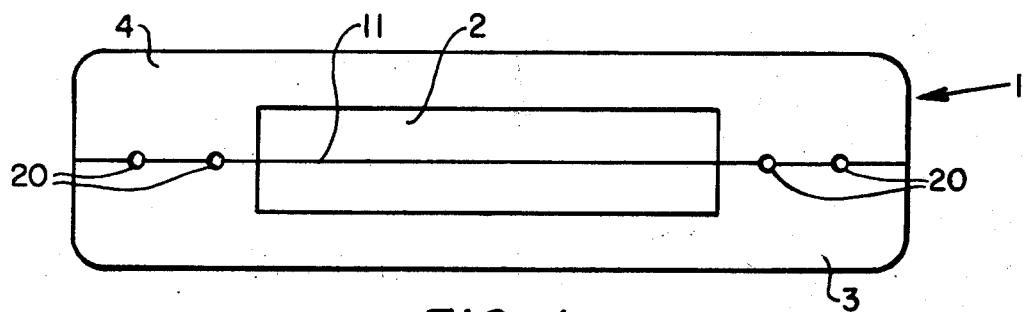
FIG. 1 is a top elevation of the novel hand meat tenderizer according to this invention.
Figure 2:
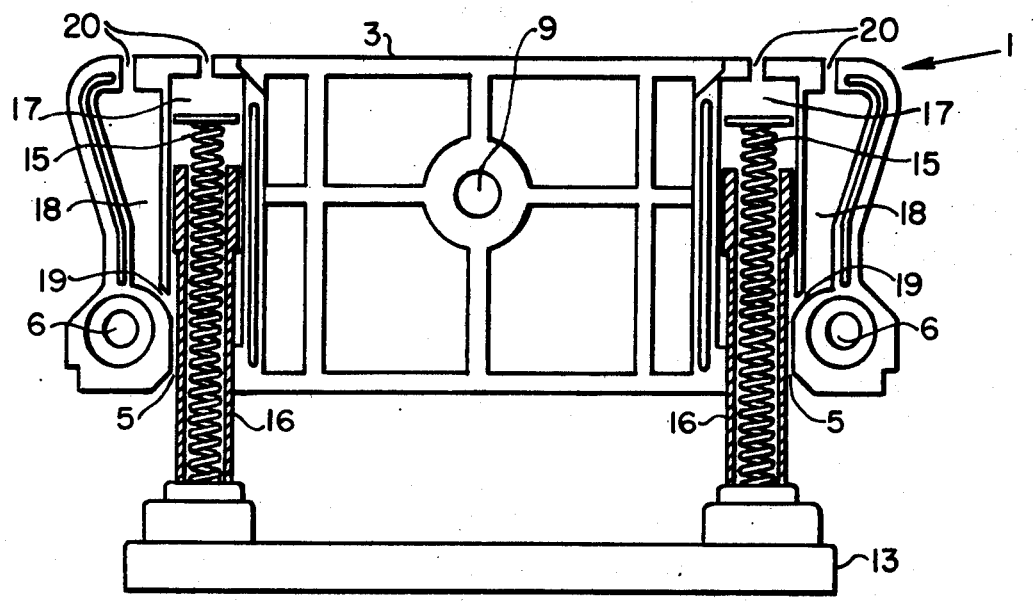
FIG. 2 is a vertical cross section of the tenderizer illustrating the hollow interior of the device.
Figure 3:
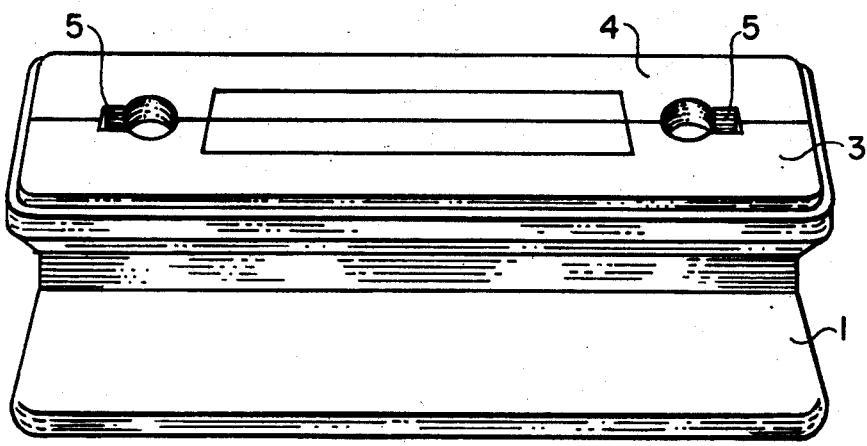
FIG. 3 is a perspective view showing the bottom portion of the handle or housing means.

In FIG. 2, a half portion or handle member 3 of handle means 1 is illustrated. The full portion handle means 1 as shown in top view of FIG. 1 preferrably comprises interfitting half members or recessed members 3 and 4 which are secured together adjacent their ends by bolts 7 which fit into bolt channels 6. The bolts 7 extend through the handle means 1 and are threadedly received in channels 6 and secured by nuts or other securing means in the handle member. A central bolt 8 fits through central bolt channel 9 and the blade segment or blade segments 10 and is threaded at its inner end in a nut or other securing means secured in handle means 1. Interposed between said handle members 3 and 4 is a blade segment assembly which comprises a blade segment 10 which may be a single blade segment or any number of blade segments greater than one. Together with blade segments 10, assembly comprises spacer blocks 2 between and in contact with adjacent blade segments over a considerable portion of the flat surfaces of the latter. The blade segment 10 is illustrated and described in detail in U.S. Pat. No. 4,199,841; however, it is a relatively thin steel blade, having projecting therefrom an array of narrow thin sharpened blades 12. The blades are on the order of 0.01 to about 0.10 inch thick. These blades 12 are aligned evenly spaced in parallel relationship. They have sharpened edges for facilitating easy penetration into the meat. Any suitable thickness and configuration of these blade elements can be used if desirable. The spacer blocks 2 are identical and each has a top portion flush with the top surface of handle 1. A stripping plate 13 is provided for guidance of blades 12 therethrough. This stripping plate 13 engages the meat to be tenderized and guides blades 12 uniformly through stripping plate guide means 14. This plate 13 is moounted in a reciprocating manner to permit movement toward and away from the handle means 1. This is provided by spring means 15 retained in connecting tubes 16. The tubes 16 are fixed and permanently secured on the upper portion of stripping plate 13 and extend at their upper ends into cylindrical wells or tube cavities 17 formed in the handle 1 by complimentary molded cavities in handle interfitting members 3 and 4. It is in these cavities and their adjacent cavities 18 that debris and liquids collect during use and/or washing. Extending from tube cavities 17 to adjacent cavities 18 are drain channels or apertures 19 that permit liquid and debris to drain from these cavities through lower drain 5. To permit an easy flow of the liquids out of each cavity, top apertures 20 are provided. While it is preferred that there be apertures opening into both cavities 17 and 18, any suitable number of apertures may be used. For example, apertures opening into only cavity 17 may be suitable. To facilitate maintaining the device of this invention as clean as possible, a cover 21 is provided for the exposed portion of blades 12. It comprises a cap 22 adapted to detachably fit tightly around stripping plate 13. In order to prevent inadvertant dislodging of cap 22 from stripping plate 13, the resilient cap periphery is made slightly smaller than the periphery of stripping plate 13. In lieu of the smaller size, or together with the smaller size, a cap extension or abuttment 23 may be used. These abuttments may be positioned on members 3 and 4 or on cover 21 as shown in drawing at 23. A single abuttment 23 or more than one abuttment may be used if desired.

Figure 4:
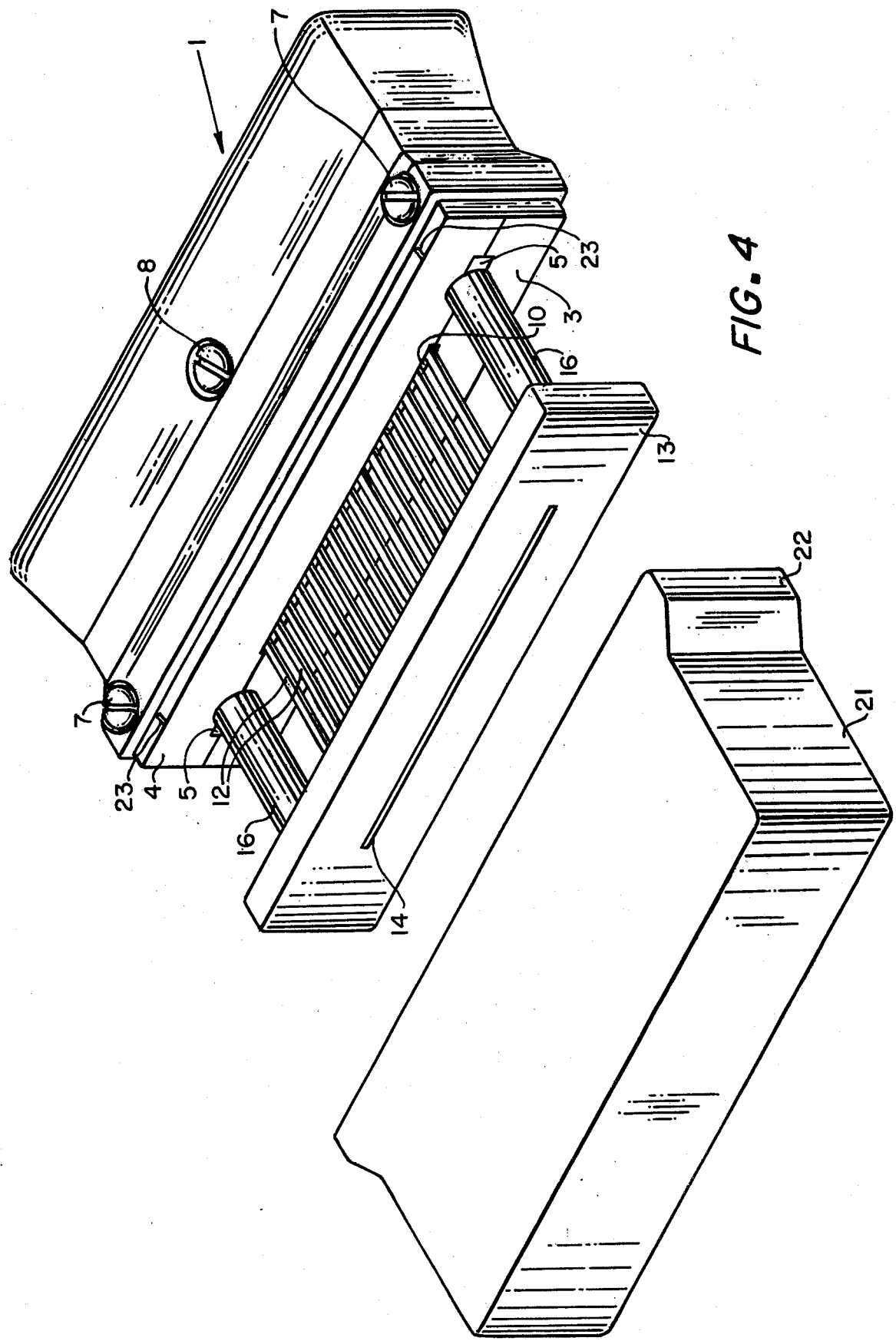
FIG. 4 is a perspective view showing the entire assembled tenderizer and detached cover of this invention.

In FIG. 4, the assembled tenderizer 1 is shown with cover 21 having a top portion or cap 22 which fits over the blade portion 12, connecting tubes 16, stripping plate 13 and all other elements below handle interfitting members 3 and 4. Cap 22 fits around the bottom periphery of elements 3 and 4 and over contacts abuttments 23. By fitting around members 3 and 4 at its lowest portion in direct contact with abuttments 23, a tight and secure fit is achieved, maintaining cover 21 securely around the lower portion of tenderizer 1. Stripping plate guide means 14 is shown having a thickness or opening of slightly more than the width of blades 12. Blade means 12 can be one single blade, or one unit or segment 10 with a plurality of blades 12 as shown, or more than one unit or segment having a single or plurality of blades. While blades are preferred as the meat tenderizing vehicle, needles, blades, pointed members, sharpened members or mixtures thereof may be used in tenderizer 1. Opening 5 is shown as it extends to the outside of tenderizer 1 to facilitate draining of the liquids out of the interior portions of the tenderizer. This opening can be located at any desired position in the bottom-most portion of 3 and 4 or either 3 or 4.

The improved tenderizer of this invention thereby provides a substantial sanitary advance over the heretofore used tenderizers. While specifics are described herein, various modifications and ramifications will occur to those skilled in the art upon a reading of the disclosure. These modifications are intended to be included within the scope of this invention.

I claim:

1. A meat tenderizer comprising a handle means, a blade assembly means, a tube connecting means, and a stripping plate means, said handle means comprising an external and an internal open liquid flow channel network adapted to permit liquid to drain from all internal hollow handle means cavities out of said handle means, said blade assembly comprising at least one blade segment and adapted to resiliently move toward and away from said handle means, said tube connecting means movably connecting said handle means and said stripping plate, said stripping plate adapted to permit at least one blade segment to pass therethrough.

2. The tenderizer of claim 1 wherein said channel network comprises at least one aperture opening from the interior of said handle means to the lower exterior portion of said handle means.

3. The tenderizer of claim 1 wherein said channel network comprises at least one aperture opening from the interior of said handle means to the upper interior portion of said handle means, said upper aperture adapted to permit lubricating means thereto.

4. The tenderizer of claim 1 wherein said channel network comprises at least one aperture opening from the interior of said handle means to both the upper and lower exterior portion of said handle means.

5. The tenderizer of claim 1 wherein said blade assembly comprises one blade segment.

6. The tenderizer of claim 1 wherein said blade assembly comprises more than one blade segment.

7. The tenderizer of claim 1 wherein said stripping plate has one blade opening therethrough.

8. The tenderizer of claim 1 wherein said stripping plate has more than one blade opening therethrough.

9. A meat tenderizer comprising a handle means, a blade assembly means, a tube connecting means, and a stripping plate means, said handle means comprising a drain network adapted to permit internally accumulated fluids to drain out of said handle means, said drain network comprising at least one internal cavity within said handle means in liquid flow contact with any other internal cavities, at least one of said cavities having means therein to permit liquid flow out of said handle means, said blade assembly means comprising at least one blade segment, said tube connecting means connecting said handle means to said stripping plate means, and said stripping plate means having openings corresponding to the number of blade segments in said blade assembly.

10. The tenderizer of claim 9 wherein said channel network comprises at least one aperture opening from the interior of said handle means to both the upper and lower exterior portion of said handle means.

11. The tenderizer of claim 9 wherein said blade assembly comprises one blade segment.

12. The tenderizer of claim 9 wherein said blade assembly comprises more than one blade segment.

13. The tenderizer of claim 9 wherein said stripping plate has one blade opening therethrough.

14. The tenderizer of claim 9 wherein said stripping plate has more than one blade opening therethrough.

15. A meat tenderizer comprising a blade cover means, a handle means, a blade assembly means, a tube connecting means, and a stripping plate means, said handle means comprising an external and an internal open channel network adapted to permit liquid to drain from all internal hollow handle means cavities out of said handle means, said blade assembly comprising at least one blade segment and adapted to resiliently move toward and away from said handle means, said tube connecting means movably connecting said handle means and said stripping plate, said stripping plate adapted to permit at least one blade segment to pass therethrough.

16. The tenderizer of claim 15 wherein said channel network comprises at least one aperture opening from the interior of said handle means to the lower exterior portion of said handle means.

17. The tenderizer of claim 15 wherein said channel network comprises at least one aperture opening from the interior of said handle means to the upper interior portion of said handle means, said upper aperture adapted to permit lubricating means thereto.

18. The tenderizer of claim 15 wherein said channel network comprises at least one aperture opening from the interior of said handle means to both the upper and lower exterior portion of said handle means.

19. The tenderizer of claim 15 wherein said blade assembly comprises one blade segment.

20. The tenderizer of claim 15 wherein said blade assembly comprises more than one blade segment.

* * * * *